United States Patent [19]

Erickson

[11] 4,438,442

[45] Mar. 20, 1984

[54] ELECTROGRAPHIC RECORDING APPARATUS WITH DELAYED PAPER DRIVE TERMINATION

[75] Inventor: Roger D. Erickson, Denver, Colo.

[73] Assignee: Honeywell Inc., Minneapolis, Minn.

[21] Appl. No.: 310,578

[22] Filed: Oct. 9, 1981

[51] Int. Cl.[3] .............................................. G01D 15/06

[52] U.S. Cl. .................................. 346/153.1; 346/134

[58] Field of Search ...................... 346/153.1, 134, 136; 355/13, 28; 118/657, 658

[56] References Cited

U.S. PATENT DOCUMENTS

| | | | |
|---|---|---|---|
| 3,816,840 | 6/1974 | Kotz | 346/153.1 |
| 3,879,737 | 4/1975 | Lunde | 346/153.1 |
| 3,946,402 | 3/1976 | Lunde | 346/153.1 |
| 4,115,817 | 9/1978 | Suzuki et al. | 346/153.1 |
| 4,316,198 | 2/1982 | Erickson | 346/153.1 |

*Primary Examiner*—Thomas H. Tarcza
*Attorney, Agent, or Firm*—Charles J. Ungemach

[57] ABSTRACT

An electrographic recording system includes means wherein toner powder having electrical and magnetic properties is deposited on a recording medium, as a solid blanket of toner which is transported by the record medium to a recording station where selected portion of that toner coating is caused to adhere to the record member in a data determined pattern while the rest is collected by suitable magnetic structure at the recording station, then unto to a fixing station whereat the record data toner particles are permanently fixed to the record member. Alternatively, toner particles are transmitted to a recording medium by a rotating drum and, under the influence of electrodes thereat cause selective particles to be adhered to the record medium. The record medium then passes from such a recording station, again, to a fixing station whereat the toner particles are permanently fixed to the record member. In such systems, a control system for the operation of such apparatus, includes a time delay arrangement wherein at the termination of a recording cycle the recording signals are turned off instantly and a time delay is instituted which is a function of the paper speed and the relative distances on the record member between the toner deposit position and the fixing position. The time delay is effective to delay the cessation of the advancement of the record member through the fixing position until such time as all of the toner remaining on the record member has passed the fixing station.

6 Claims, 3 Drawing Figures

ELECTROGRAPHIC RECORDING APPARATUS WITH DELAYED PAPER DRIVE TERMINATION

CROSS REFERENCES

Cross references made to copending application of Roger D. Erickson, U.S. Pat. No. 4,316,198; Kotz, U.S. Pat. No. 3,816,840; Lunde, U.S. Pat. No. 3,879,737; Lunde, U.S. Pat. No. 3,946,402.

BACKGROUND OF THE INVENTION

The present invention relates to Electrographic Recording apparatus. More particularly, it relates to an improved control means for electrographic recording apparatus.

Recently there has been developed an electrographic recording technology wherein the need for providing latent electrostatic images is eliminated. That technology is illustrated in Kotz, U.S. Pat. No. 3,816,840, Lunde, U.S. Pat. No. 3,879,737 and Lunde, U.S. Pat. No. 3,946,402, as well as in the above-noted copending application, Ser. No. 152,599. In accordance with the teachings in those patents, as well as in the copending application, a quantity of toner powder which has both electrical and magnetic properties is contained in a hopper position adjacent a drum made of non-magnetic material. Within the drum there is a magnet structure creating a magnetic field extending through the periphery of the surrounding drum. In one form of the structure disclosed, the drum rotates about an axis coaxial with the central magnet structure while the magnetic core is fixed. In another form, the outer drum is stationary while the inner magnetic core is rotated. In either case, the toner powder is drawn from a hopper by the magnetic field to be attracted to the outer periphery of the drum. The rotation of the drum or the magnetic core causes the toner particles to be translated around the periphery of the drum to a recording station. At the recording station, the recording medium, comprising a backing sheet such as paper having a dielectric coating thereon, is driven along a path spaced a small distance from the surface of the toner carrying drum. An electrically conductive element is positioned on the opposite side of the record member from the drum. Under the influence of the magnetic fields, the toner particles form whisker like strings about the surface of the drum. These whisker strings are of sufficient length to brush the surface of the record member. Because of the magnetic fields, these toner particles are not deposited upon a surface of the record receiving member unless an electric field is established between the drum or the electrodes carried by drum and the back-up conductive plate on the opposite side of the record member. When such electric fields are established, the electrostatic charges overpower the magnetic field influence and deposit the toner particles in selected areas on the record member in accordance with the pattern established by the electric fields.

In analogous embodiment shown in the aforementioned patents, a somewhat different technique is employed in that the record member is uniformally coated with toner powder and the unwanted portions of the toner powder is then picked off by the magnetic field, the desired portions being adhered to the record member by the superimposition of an electric field in the manner aforementioned. These improvements have thus provided a recording technique wherein records of data may be made without first imposing an electrostatic image on the record member which must then be developed by the toner. It is, in effect, a direct writing technique.

There is, in each of the systems heretofore described, a problem which has not been addressed. In each of the systems, when an end of recording has occurred the switches are turned off and the entire system comes to a stop including the recording and the paper drive mechanism. In either of the systems, when such system shutdown occurs, there is a quantity of loose toner on the record member which has not been "fixed" to the record member. Accordingly, in time, such unfixed toner creates both a messy condition within the recorder and has a tendency to fall off into the recording mechanism causing a potential jam situation.

SUMMARY OF THE INVENTION

It is, accordingly, an object of the present invention to provide an improved electrographic recording apparatus.

It is another object of the present invention to provide an improved control means for an electrographic recording apparatus which obviates the foregoing shortcomings.

In accomplishing these and other objects, there has been provided, in accordance with the present invention, an electrographic recording system wherein toner powder having electrical and magnetic properties is deposited on a recording medium, as a solid blanket of toner which is transported by the record medium to a recording station where selected portion of that toner coating is caused to adhere to the record member in a data determined pattern while the rest is collected by suitable magnetic structure at the recording station, thence onto to a fixing station whereat the record data toner particles are permanently fixed to the record member. Alternatively, toner particles are transmitted to a recording medium by a rotating drum and, under the influence of electrodes thereat cause selective particles to be adhered to the record medium. The record medium then passes from such a recording station, again, to a fixing station whereat the toner particles are permanently fixed to the record member. In such systems, a control system for the operation of such apparatus, includes a time delay arrangement wherein at the termination of a recording cycle, the recording signals are turned off instantly and a time delay is instituted which is a function of the paper speed and the relative distances on the record member between the toner deposit position and the fixing position. The time delay is effective to delay the cessation of the advancement of the record member through the fixing position until such time as all of the toner remaining on the record member has passed the fixing station.

BRIEF DESCRIPTION OF THE DRAWINGS

A better understanding of the present invention may be had from the following detailed description when read in the light of the accompanying drawings in which.

DETAILED DESCRIPTION

Figure 1:
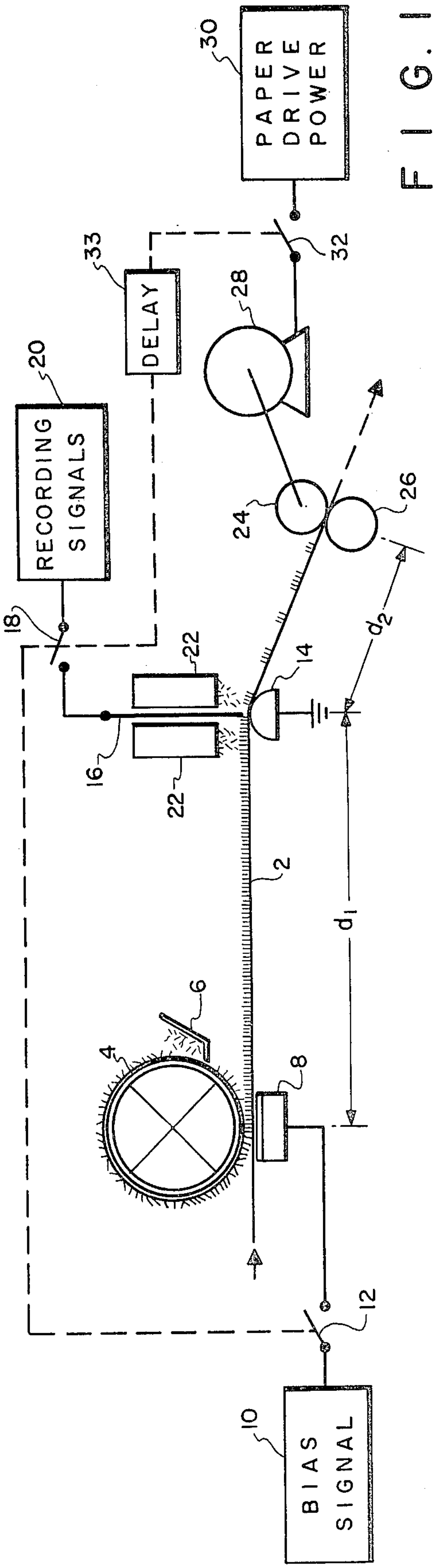
FIG. 1 is a schematic representation of one form of electrographic recording system embodying the present invention.

Referring now to the drawings in more detail, there is shown in FIG. 1 an electrographic recording apparatus which is basically similar in concept to that illustrated in Lunde, U.S. Pat. No. 3,946,402 in that a blanket of toner is laid down on the record member and then subsequently selected portions of that toner are picked up at a recording station while certain other portions are adhered to the record member by operation of recording signals. Specifically, in FIG. 1, there is shown a record medium 2 of the type illustrated in the aforementioned patents and application. The record member 2 is drawn from a source, not shown past a toner depositing station represented by the toner drum 4. A hopper 6 positioned adjacent the drum 4 supplies a quantity of toner powder having electrical and magnetic properties to the drum 4. The toner particles are caused to adhere to and be carried about the surface of the drum 4 by an internally generated magnetic field. The toner particles are thereby carried about the drum to a depositing position adjacent the record member 2.

A blanket layer of toner powder is caused to loosely adhere to the record member 2 by the conjoint operation of the toner drum 4 and an electrostatic field applying electrode 8 positioned on the opposite side of the record member 2 from the drum 4. The electrode 8 is selectively energized from a bias signal source 10 through a switch 12. The thus blanketed record member 2 is caused to move past a recording station at which the record member passes over a grounded back-up platen 14 positioned opposite an array of recording electrodes 16. The electrodes 16 are selectively connected through a switch 18 to a source of recording signals 20.

Also located at the recording station is a suitable magnet structure 22. The magnet structure is such that toner particles from the record member 2 are picked up and carried away from the record member 2 in the absence of recording signals on the electrodes 16. When the switch 18 is closed, the source of recording signals 20 applies signals, in accordance with input data, selectively to individual ones of the array of electrodes 16. The energization of selected ones of the electrodes 16 cause the toner particles opposite those energized electrodes to be adhered to more firmly to the record member 2. Where such signals are not applied, the magnet structure 22 causes all of the other toner particles, or substantially all of the toner particles, to be picked up and carried away from the record member 2, leaving toner particles on the record member 2 in the pattern of the applied signals.

The record member 2 carrying the remaining toner particles is then translated to a fixing station which, in the illustrative embodiment, is a pair of pressure rollers 24 and 26. In the illustrated embodiment, the pressure roller 24 is driven as by a motor 28. Thus driven, the pressure rollers 24 and 26 comprise a means for imparting forward motion or drive to the record member 2. The motor 28 is selectively energized from a paper drive power source 30 through a selectively operated switch 32.

With the switches 12, 18 and 32 all closed, the system is operative to lay down a blanket of toner from the toner drum 4 through the exitation of the back-up electrode 8 onto the record member 2. That record member 2 then conveys that blanket of toner to the recording station where recording signals from the source 20 are applied to selected ones of the electrodes 16 in accordance with the data signals. The application of signals to the electrodes 16 cause the toner to be more firmly electrostatically adhered to the surface of the record member in the pattern of the signals applied to the several electrodes 16 in cooperation with the grounded platen 14. The remainder of the blanket of toner on the record member 2 is attracted to the magnet structure 22 and thereupon moved away from the record member 2. The record member 2 with the toner defining the areas representative of the applied signals is then drawn by the driving of the pressure rollers 24 and 26 to the fixing station whereat the applied pressure between the rollers causes the toner on the record member 2 to be permanently fixed thereto.

When the blanket of toner is laid down on the record member 2, the electrostatic field established between the drum 4 and the electrode 8 cause the toner particles to be attracted to and lightly adhered to the record member 2 by an electrostatic attraction. At the recording station, in the absence of signals applied to the selected electrodes 16 the toner particles are discharged electrically and, the magnetic field developed by the magnetic structure 22 is sufficient to draw away the toner particles from the record member 2. The application of signals to the selected electrodes 16 causes a much stronger electrostatic field to be established between the selected electrodes and the back-up platen 14 thus effecting a much stronger electrostatic attraction of the particles to the record member in the pattern of the applied signals.

If at the end of a recording passage, in the interest of conserving the record member supply, the system is stopped with all of the switches 12, 18 and 32 opened simultaneously, the forward motion of the record member 2 past the pressure rollers 24 and 26 would stop leaving on the surface of the record member 2 toner particles between the recording styli 16 and the pressure rollers of the fixing station as well as the blanket of toner between the drum 4 and the recording station. The electrostatic charge that lightly holds the toner particles on the surface of the record member would decay and thereby allow the toner particles to be dispersed within the recording apparatus or otherwise make a mess.

In accordance with the present invention, when the end of the recording passage has occurred, the switches 18 and 12 are opened immediately removing the bias signal from the electrode 8 and removing any recording signals from the electrodes 16. With no bias signal on the electrode 18 the toner will not be deposited from the drum 4 onto the record member 2 but will be retained on the drum 4 by the internal magnetic field. Similarly, with no signals applied to the electrodes 16, whatever toner has already been applied as a blanket coating on the record member 2 will be picked up by the magnet structure 22, leaving no residual toner on the record member beyond the recording station. The pressure rollers 24 and 26 will continue to be driven for a predetermined delay period after the cessation of the recording interval continuing to draw the record member past the toning station and the recording station through the fixing station. After the delay which will be determined, by a delay means 33, to be sufficient to have fixed any toner that had previously been deposited and remaining on the record member 2, the switch 32 will then be opened thereby completing the turn-off of the system.

Figure 2:
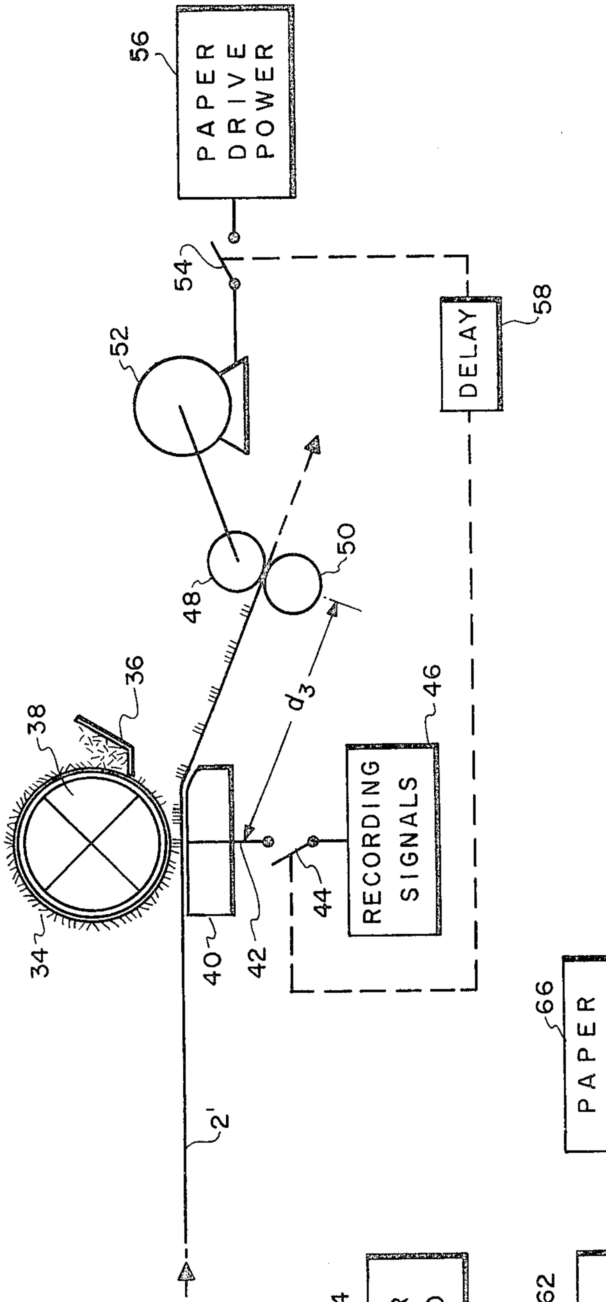
FIG. 2 is a schematic representation of a different form of electrographic recording apparatus embodying the present invention.

In FIG. 2 there is shown a recording system of a somewhat different type such as that shown in the aforementioned Kotz, U.S. Pat. No. 3,816,840 or the Lunde U.S. Pat. No. 3,879,737. In that apparatus, the record member 2′ is drawn from a supply, not shown, past a recording station which includes a toner drum 34. The drum 34 may be of the type illustrated in the aforementioned Kotz patent or may be of the type illustrated in the Lunde U.S. Pat. No. 3,879,737. In either case, toner particles are drawn from a hopper 36 by a magnetic field developed by an internal magnet structure 38. On the opposite side of the record member 2′ from the toner drum 34, there is a back-up platen 40, preferably formed of a non-conductive non-magnetic material. In the embodiment illustrated in FIG. 2, there is an array of recording electrodes 42 shown as extending through the back-up platen 40, substantially in line with the axis of the drum 34. The electrodes 42 are selectively connected through a corresponding array of switch members 44 to a source of recording signals 46.

The record member 2′ is drawn past the recording station to a fixing station which, in the illustrative embodiment, includes a pair of pressure rollers 48 and 50. As before, the pressure roller 48 is driven by a motor 52 which is, in turn, selectively connected through a switch member 54 to a source of power 56.

Again, in operation, the record member 2′ is drawn from the supply past the recording station. At that point the toner is drawn from the hopper 36 about the toner drum 34 by the magnetic field generated by the magnetic structure 38 positioned internally of the drum. As the toner particles on the drum 34 are brought into contact with the record member 2′, if there is no recording signal applied to the electrodes 42 through the closed switch 44 from the source recording signals 46, the toner particles will brush the surface of the record member and be again picked up by the toner drum 34, leaving no toner particles on the record member 2′. On the other hand, if selected recording signals are applied from the signal source 46 through the switch 44 to selected ones of the electrodes 42, the electrostatic field generated as a result of the application of such signals to the electrodes will overpower the force of the magnetic field from the source 38 to cause toner particles to be deposited on the surface of the record member in accordance with the pattern defined by the recording signals. The toner particles are then adhering to the surface of the record member by electrostatic attraction. The record member bearing such toner particles is then drawn past the fixing station, that is between the rollers 48 and 50 where the pressure exerted on the opposite faces of the record member 2′ cause the toner particles to be permanently fixed to the surface of the record member.

Again, when an end of a recording segment has arrived, the recording signals are instantaneously stopped, as by the opening of the switch 44. In order to prevent a portion of the record member bearing toner particles remaining in the apparatus following the cessation of such recording segment, the interruption of the power supply to the motor 52 is delayed by a delay means 58 until such time as the portion of the record member 2′ bearing such toner particles has passed the fixing station represented by the pressure rollers 48 and 50. At that time, the circuit to the motor 52 may then be opened by the switch 54 and the forward motion of the record member stopped Thus, there would remain no portion of the record member in the machine during a turn-off condition which has residual toner powder loosely supported on the record member without it being permanently fixed.

Figure 3:
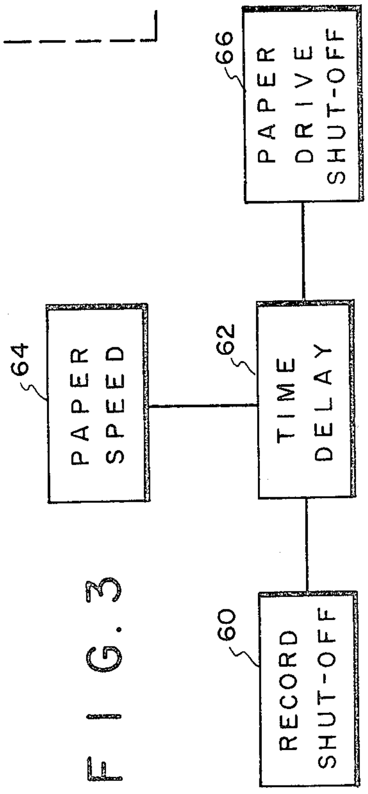
FIG. 3 is a schematic block diagram of the control arrangement for electrographic recording apparatus in accordance with the present invention.

In accordance with the present invention, the delay means, such as the delay means 58 of FIG. 2 and the comparable delay means 33 of FIG. 1 may be structured in accordance with the schematic diagram shown in FIG. 3. It is contemplated that the actual time delay will be a function of the distance between the indicated elements of the recording system and the speed at which the record member is being driven. More specifically, the time delay will be directly proportional to the measuring distance and inversely proportional to the speed of the record member. Thus, in FIG. 3, the record shut-off means 60 initiates the operation of the time delay circuitry 62. The time delay circuit 62 is adjusted in accordance with the paper speed 64. The output of the time delay circuit 62 is connected to trigger the paper drive shut-off means 66.

In the illustrative embodiment as shown in FIG. 1, there are two distance factors to be considered. These are illustrated as $distance_1$ which is the distance between the toning station and the recording station. The other distance is $designated_2$ which is the distance between the recording station and the fixing station. In accordance with the present invention, if the $distance_1$ is greater than the $distance_2$, then that $distance_1$ would be the determinative for the time delay unit 62. On the other hand, if $distance_2$ had been the greater distance then that distance would have been the determinative distance for the time delay unit 62. In the embodiment illustrated in FIG. 2, the $distance_3$ between the recording station and the fixing station is the only distance to be considered and would be the determinative distance for the time delay unit 62.

Thus, there has been provided, in accordance with the present invention, an improved control means for an electrographic recording apparatus which provides means for avoiding the spill of unfixed toner into the recording apparatus.

The embodiments of the invention in which an exclusive property or privilege is claimed are defined as follows:

1. An electrographic recording apparatus comprising:
  - a record medium;
  - motive means for driving said record medium at a predetermine linear speed;
  - means for depositing toner particles on said record medium as it is drawn past a first position by said motive means;
  - means for fixing said toner particles onto said record medium as said record medium is drawn past a second position by said motive means, said second position being spaced a fixed distance subsequent to said first position;
  - means for terminating the deposit of said toner particles on said record medium at a selected time; and
  - delay means for terminating the operation of said motive means a predetermined time after said selected time.

2. An electrographic recording apparatus as set forth in claim 1 wherein means for depositing toner particles on said record medium includes means for depositing a blanket layer of said toner particles on said record member.

3. An electrographic recording apparatus as set forth in claim 2 and including a recording station positioned along the path of said record medium and at a position intermediate said first and second position, said recording station including magnetic field means for removing said toner particles from said record medium and selectively energized electrode means for superimposing electrostatic fields in accordance with signal controlled pattern for overriding said magnetic field to cause residual toner particles to remain on said record medium in accordance with said pattern.

4. An electrographic recording apparatus as set forth in claim 3 wherein the delay imposed by said delay means is proportional to the greater of (1) the distance from said first position to said recording station and (2) the distance from said recording station to said second position; and inversely proportional to said linear speed.

5. An electrographic recording apparatus as set forth in claim 1 wherein said means for depositing toner particles on said record medium comprises a recording station whereat toner particles are deposited on said record medium in accordance with signal controlled patterns.

6. An electrographic recording apparatus as set forth in claim 5 wherein the delay imposed by said delay means is proportional to the distance between said recording station and said second position, and inversely proportional to said linear speed.

* * * * *